United States Patent [19]

Osakabe et al.

[11] Patent Number: 5,193,278
[45] Date of Patent: Mar. 16, 1993

[54] ROTARY CUTTER

[75] Inventors: Mitsuo Osakabe; Minoru Shibasaki, both of Gunma; Toshimichi Kaneniwa, Tomioka; Nobuyuki Sekikawa, Takasaki, all of Japan

[73] Assignee: Starting Industry Company Limited, Japan

[21] Appl. No.: 863,690

[22] Filed: Apr. 2, 1992

[30] Foreign Application Priority Data

Dec. 17, 1991 [JP] Japan .................. 3-353205

[51] Int. Cl.⁵ .................................. A01D 50/00
[52] U.S. Cl. .............................. 30/276; 30/347
[58] Field of Search .............. 30/276, 347; 56/12.7

[56] References Cited

U.S. PATENT DOCUMENTS

| | | | |
|---|---|---|---|
| 4,357,052 | 10/1985 | Baba et al. | 30/276 |
| 4,599,796 | 7/1986 | Baba | 30/276 |
| 4,607,431 | 8/1986 | Gay | 30/276 |

Primary Examiner—Douglas D. Watts
Attorney, Agent, or Firm—Wall and Roehrig

[57] ABSTRACT

Apparatus for cutting foliage having a rotating head and an annular ring mounted for independent rotation in the head. A cam follower is pivotally mounted in the ring and is guided along a circumferential camming surface formed in the head. The camming surface has spaced apart lobes located adjacent to stops. The free end of a supply line is passed over the cam follower and passed out of the ring to a predetermined cutting length. When the head is rotating at operational speed, the resultant centrifugal force of the follower and the line will hold the follower against the stop. If the line is worn or damaged the holding force is decreased and the follower is released and guided over the stop thus allowing the ring to turn relative to the head until the next stop is encountered. This causes a given amount of line to be played out to replenish the damaged or worn section.

8 Claims, 7 Drawing Sheets

ROTARY CUTTER

BACKGROUND OF THE INVENTION

This invention relates to a foliage cutter having an extendable line mounted in a rotatable head which severs grass and foliage that it comes in contact with and, in particular, to apparatus for automatically dispensing line from the head when the line becomes foreshortened due to breakage or usage.

Some grass cutters of this type utilize spring-loaded reels for dispensing additional line from the head. To activate the reel, the head must be struck against the ground to depress the biasing spring and thus dispense a short amount of line. These devices work well in practice, however, it is difficult to ascertain when the line has become shortened or exactly how much line is dispensed during each reel actuation cycle. Striking the ground with the reel housing may also cause stones, gravel, dirt and the like to be sprayed about which can cause bodily harm and damage to nearby articles. This continuous striking of the head can also cause equipment damage over a period of time.

Other cutters have been devised which rely on an increase in the speed of the reel head to extend the cutting line. These devices require additional mechanisms which typically increase the weight and complexity of the equipment. Increasing the speed of the device also can lead to unwanted overloading of the engine and moving parts. This, in turn, results in unstable operating conditions and early wear on the equipment.

An improved system is described in a Japanese publication, Tokkai Sho No. 63-314700 solves some of the abovenoted problems. This equipment, however, is still relatively complex, difficult to manufacture and exhibits certain unstable operating condition.

SUMMARY OF THE INVENTION

It is therefore an object to improve apparatus for cutting grass and similar foliage with a rotating cutting line.

A further object of the present invention is to provide a grass cutter utilizing a rotating line that will automatically sense the length of the line and distribute additional line when the line becomes broken or worn.

Another object of the present invention is to eliminate the need of striking the head of a line-type lawn cutter or increasing the cutter speed when additional line is required.

Yet another object of the present invention is to improve grass cutting devices using rotating cutting lines without having to increase the complexity of the device.

These and other objects of the present invention are attained by apparatus for automatically dispensing line from the head of a rotating grass cutter that includes a rotating head in which is stored a coil of cutting line. An annular ring is mounted in the head that is free to rotate independently and the free end of the line passes out of the head through a hole in the ring. A circumferential camming surface is formed in the head which directs the motion of a cam follower mounted in the ring. The cam follower is maintained in sliding contact with the line and is adapted to lock the line against a series of stops spaced about the camming surface. Lobes are positioned along the camming surface adjacent each stop which direct the follower over the stop when the follower is released from the stop. Release occurs automatically through centrifugal forces acting upon the rotating components when the extended section of the line becomes foreshortened. The cam follower, upon passing over a lobe, is permitted to move on to the next lobe thus dispensing a metered amount of line.

BRIEF DESCRIPTION OF THE DRAWINGS

For a better understanding of these and other objects of the invention, reference will be made to the following detailed description of the invention which is to be read in conjunction with the accompanying drawings, wherein.

DETAILED DESCRIPTION OF THE INVENTION

Figure 2:
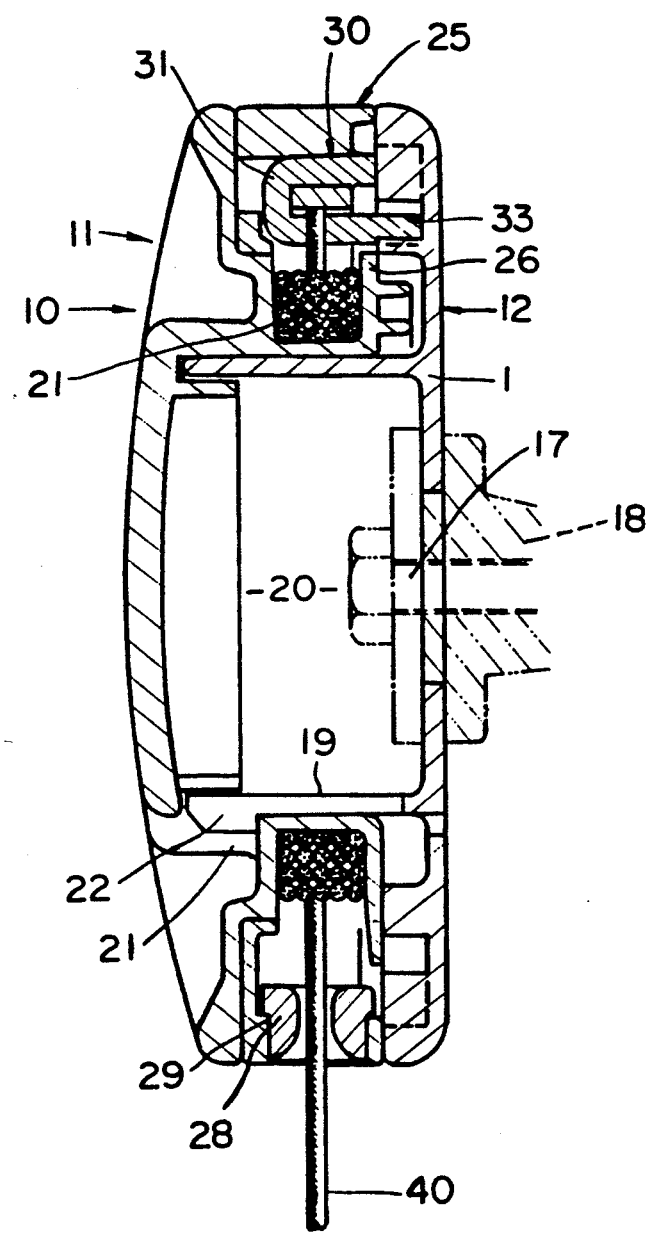
FIG. 2 is an end view in cross-section showing the construction of the rotary cutter.

As shown in the drawings, the head 10 of the rotary cutter includes an upper housing 11 and a lower housing 12. A camming surface 13 in the form of a circumferential groove 14 is cut in the inner side face of the upper housing 11. The groove is provided with radially-extended lobes 15 that are equally spaced about the groove, the purpose of which will be explained in greater detail below. A hole 17 is provided in the center of the upper housing that is adapted to receive a coupling 18 (FIG. 2) for connecting the head to the drive unit of the rotary cutter. The lower housing has a cylindrical chamber 20 having cut-outs 21 therein. The upper housing is provided with a series of axially-disposed tongues 19 that pass into the chamber 20. Each tongue is equipped with a radially-extended hook 22 that is adapted to snap into the cut-out 21 and thus secure the housings together in assembly.

An annular-shaped ring 25 is mounted between the two housings so that the ring can rotate freely therebetween. A line storage spool 26 is included in the lower housing which, in assembly, faces the inner side wall of the ring. A quantity of line 27, preferably nylon cord, is wound about the spool. The free ends of the wound coil are passed out of the head through opposed openings formed in the ring. A line guide 28 is mounted in each of the openings 29—29 through which the free end 40 of the line is dispensed.

Figure 3:
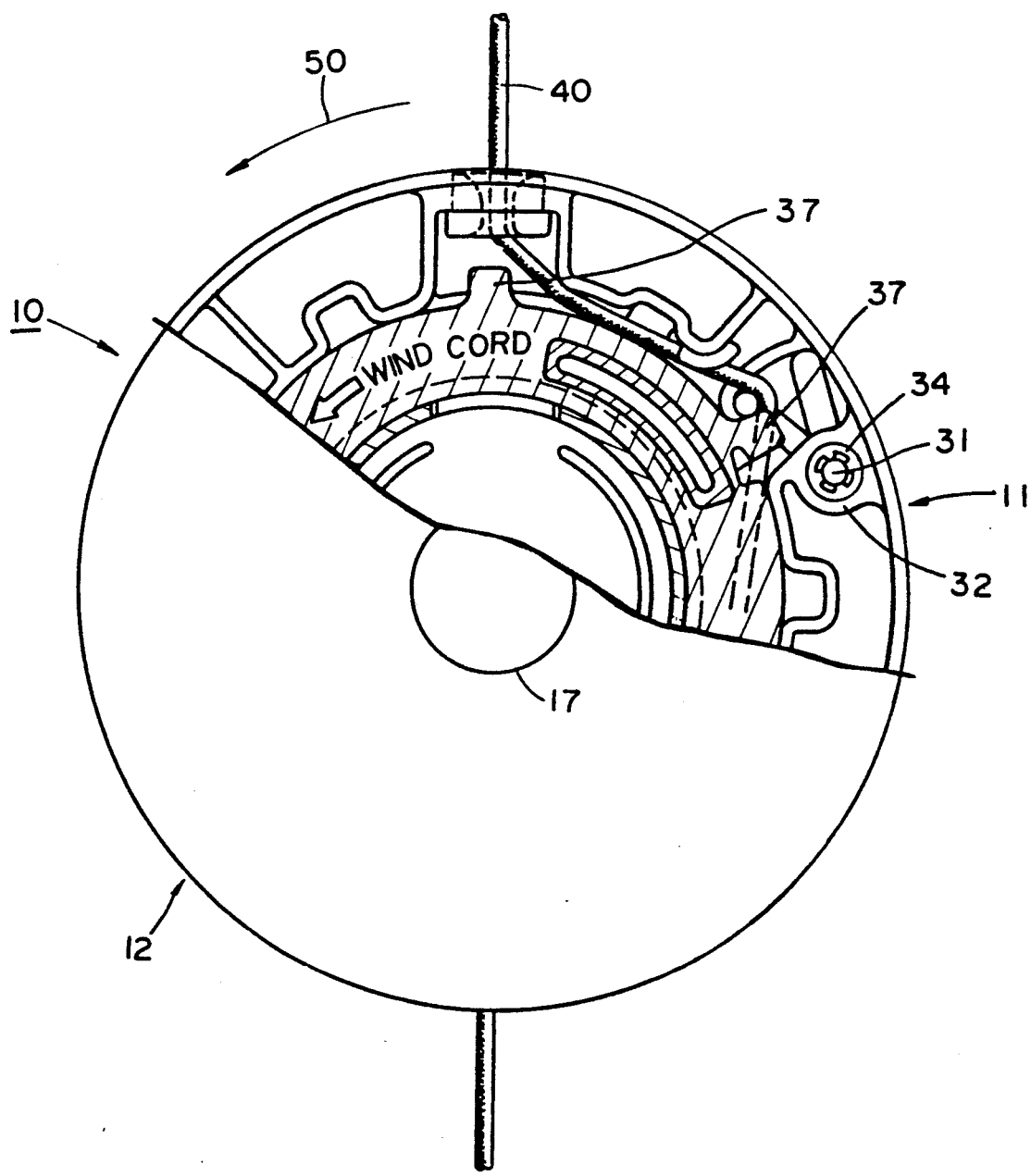
FIG. 3 is a bottom plan view with portions broken away of the present rotary cutter.
Figure 4:
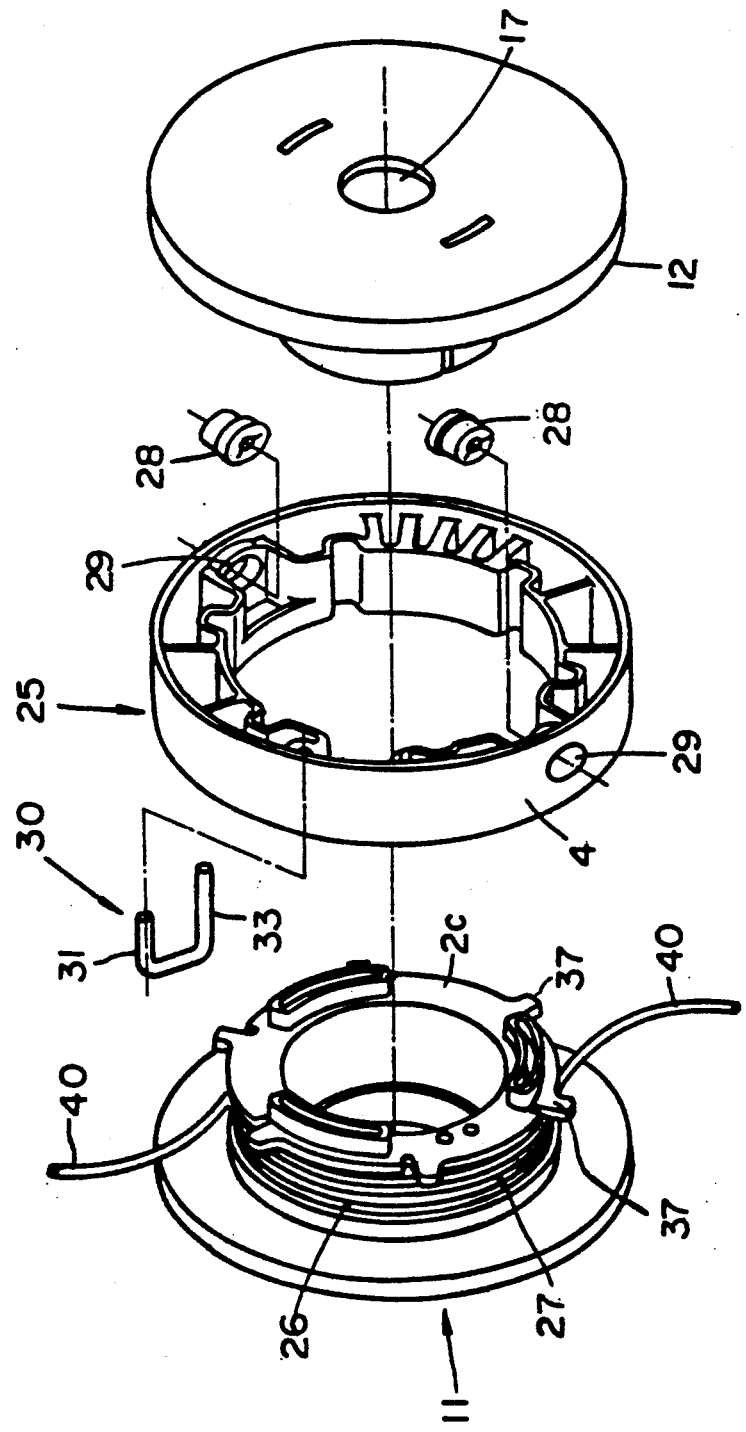
FIG. 4 is an exploded view in perspective showing component parts of the rotary cutter.

A U-shaped cam follower 30 is pivotally supported within the ring. The follower contains pivot leg 31 that is mounted for rotation in embossment 32 and an opposing follower leg 33 is adapted to ride within the groove of the camming surface. The pivot leg passes through the embossment and is secured in place by a deformable washer 34 (FIG. 3), or the like. As can be seen, as the follower is capable of passing over the spaced-apart lobes it pivots about the axis of leg 31.

The inner face 36 of the lower housing contains a series of stops 37—37 equal in number to the number of lobes contained in the camming surface. In assembly, the stops are positioned adjacent each of the lobes as shown in FIGS. 1, and 5A-5C. The radial height of each stop is less than that of the adjacent lobes so that the leg 33 of the cam follower, which rides in the groove 131, is capable of riding over the stop as it is guided along the lobe.

Figure 1:
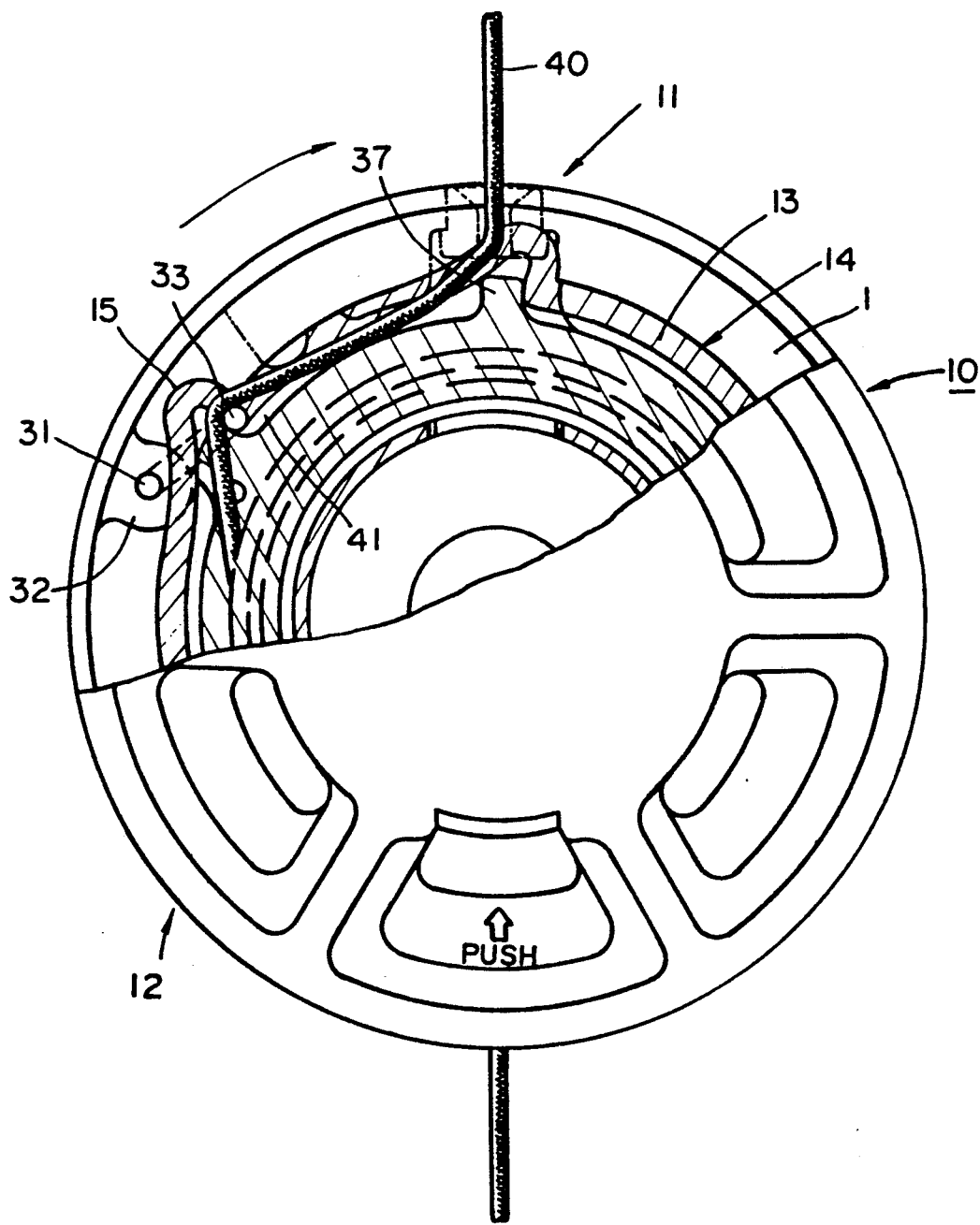
FIG. 1 is a top plan view with portions broken away showing the rotary cutter of the present invention.

One free end of the line, depicted at 40, is threaded over the follower leg 33 of the cam follower. When the follower leg is situated at the entrance 41 of a lobe, the follower leg rests against the adjacent side wall of the stop. At this time, the follower arm 31 is positioned between the line and the stop as shown in FIGS. 1 and 5C. With further reference to FIG. 5C, the head of the mowing or cutting equipment is arranged to rotate in a clockwise direction as indicated by arrow 50 in FIG. 5C. When the free end of the line extends outwardly from the head a predetermined distance, and the head is turning at operational speed, the resultant centrifugal force P acting upon the line and the cam follower is sufficient to hold the cam follower against the stop. This, in turn, prevents the ring from turning independently about the pivot arm 31. As the line becomes worn, the force T acting upon the line diminishes thus reducing the holding force acting against the stop.

Figure 5A:
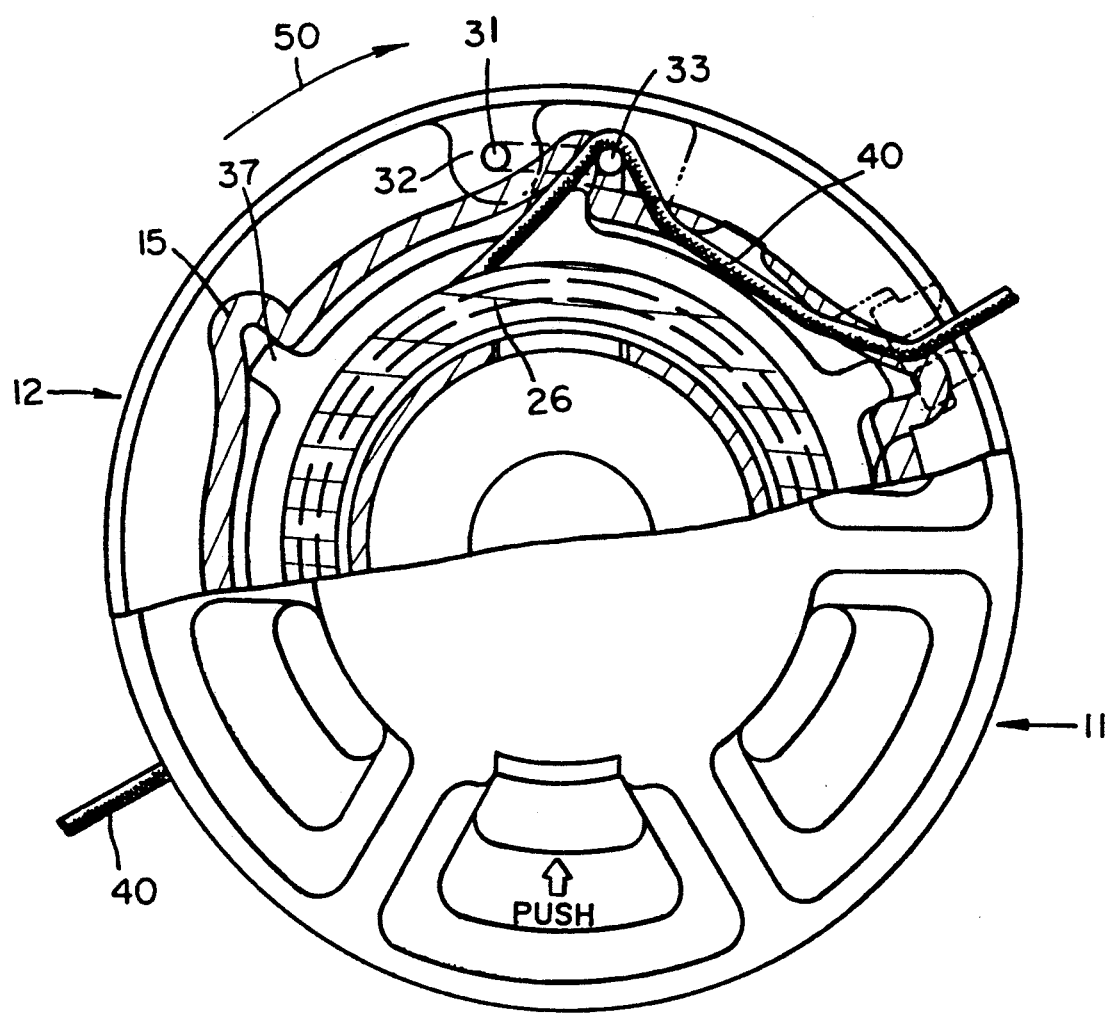
FIG. 5A is a top plan view with portions broken away showing the line indexing mechanism in the start of a line indexing cycle.
Figure 5B:
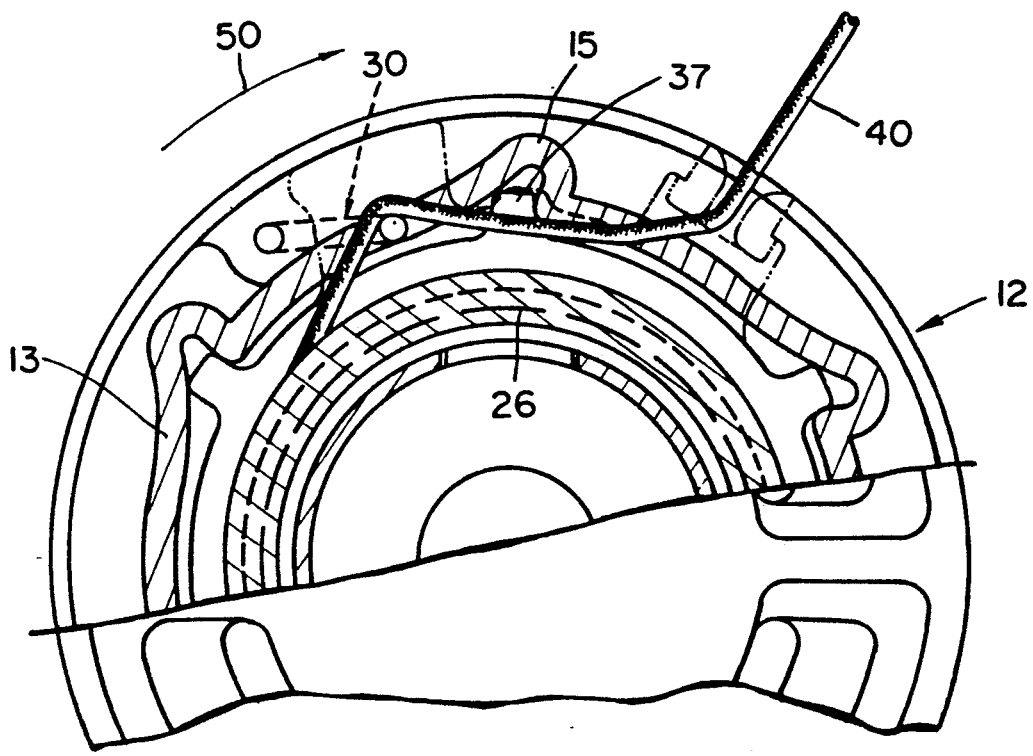
FIG. 5B is a top plan view similar to FIG. 5A showing the indexing mechanism in the middle of a line indexing cycle.
Figure 5C:
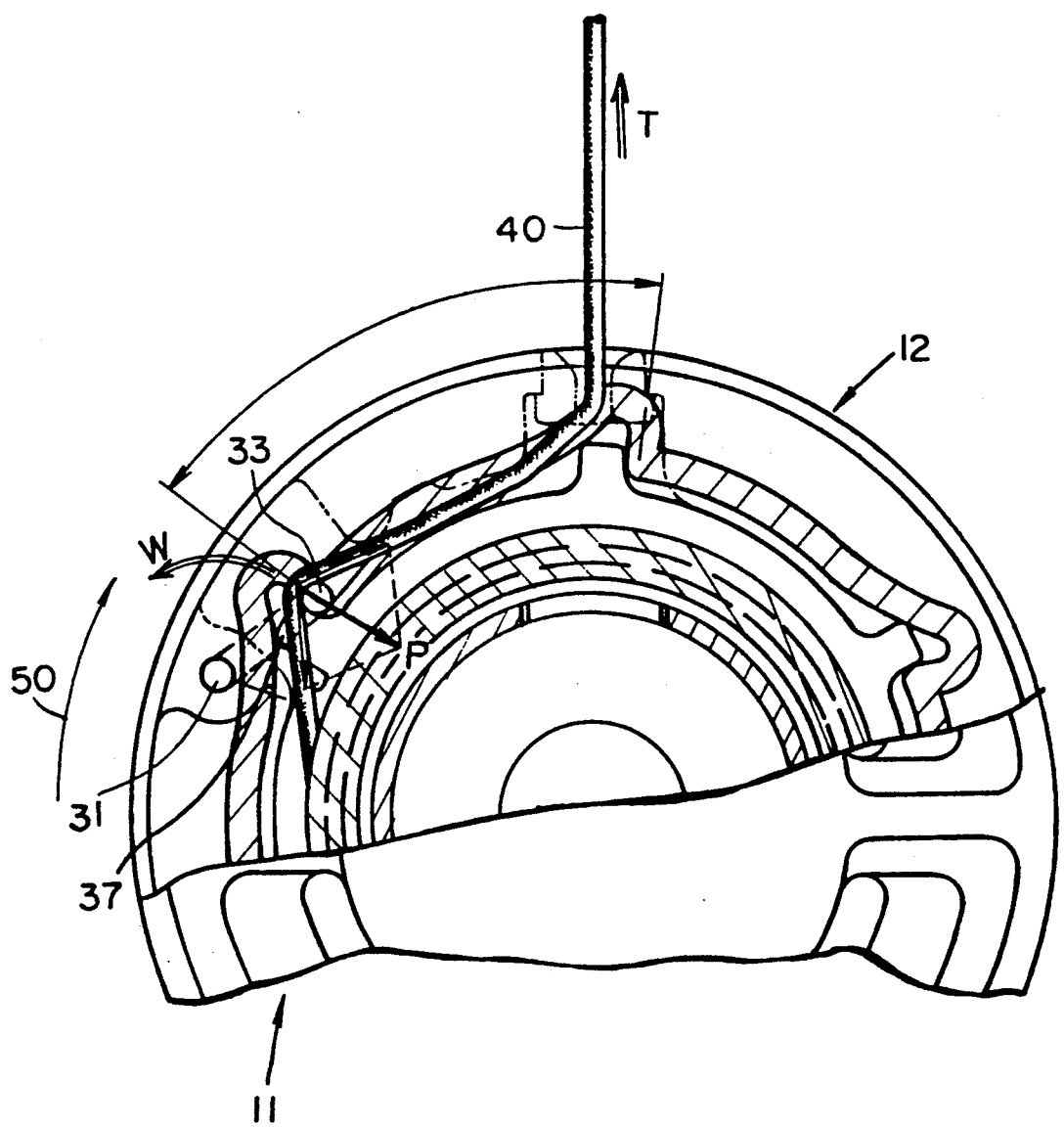
FIG. 5C is a top plan view similar to FIG. 5A showing the indexing mechanism at the end of a line indexing cycle.

A point is reached where the centrifugal force W acting on the cam follower predominates and the follower is permitted to swing upwardly over the lobe to clear the stop as shown in FIG. 5A. This releases the ring which now rotates in a direction opposite that of the head. As the ring moves back, as illustrated in FIG. 5B, line is distributed from the storage spool through the line guide thus extending the free end of line situated outside the head. The cam follower is guided along the groove of the camming surface until it reaches the entrance of the next downstream lobe where it again contacts a stop. If sufficient line has been played out to produce a holding force P, the ring travel is halted and no further line is played out. If the holding force P is not equalled or exceeded, the ring is indexed to the next lobe, and so on, until the desired length of line extends from the head.

As can be seen, the apparatus of the present invention will sense the free length of the line and automatically provide additional line from the supply spool when the free end becomes worn or broken, without actuation by the operator. An optimum length of line is continually maintained thereby resulting in a stable running condition. This automatic feeding operation is achieved with the use of a minimal amount of simple parts thus providing for a lightweight cutter exhibiting long life and reduced maintenance.

While this invention has been described with specific detail to the disclosure above, it is not necessarily limited to that description. Rather, any modifications and variations would present themselves to those skilled in the art without departing from the scope and spirit of this invention, as defined in the impending claims.

What is claimed is:

1. Apparatus for automatically dispensing line from a rotating cutter for cutting foliage that includes
    a head connected to a drive means for rotating the head about a central axis,
    an annular ring mounted in said head for independent rotation about said axis,
    a spool means for storing a coil of line about said axis with at least one free end of the line passing outwardly through an opening formed in said ring,
    a circumferential camming surface positioned in said head having radially-extended lobes spaced apart along said surface,
    stop means located adjacent to each lobe,
    a cam follower pivotally mounted in said ring and adapted to ride in contact with said camming surface, said follower being able to move in contact with said stop means as the follower enters each lobe,
    said free end of the line arranged to move in sliding contact with the cam follower to hold the follower against the stop means when the free end of the line extends outwardly a predetermined distance from said head and to automatically release the follower from the stop when the line becomes foreshortened through wear or breakage whereby the follower is guided around the stop and allowed to pass to the next stop as the ring turns in the head thus dispensing additional line through said opening.

2. The apparatus of claim 1 wherein the head further includes an upper housing that is removably connected to a lower housing.

3. The apparatus of claim 2 wherein said ring is rotatably supported between said housings.

4. The apparatus of claim 3 wherein said camming surface is a groove formed in one of said housings.

5. The apparatus of claim 4 wherein said cam follower is a U-shaped member having a first leg pivotally supported in said ring and a second leg slidably contained in said camming surface groove.

6. The apparatus of claim 5 wherein said stop means is formed in said other housing adjacent to the camming surface groove.

7. The apparatus of claim 1 wherein the ring has two opposed openings formed therein and opposing free ends of said line are passed outwardly through said openings.

8. The apparatus of claim 2 wherein one housing has a series of axially-extended tongues each containing a radially-extended tab at its distal end and said other housing contains an axially-aligned cylinder for slidably receiving said tongues in a depressed condition, said cylinder having cut-outs therein for receiving said tabs whereby the two housings are locked together when the tabs are situated in said cut-outs.

* * * * *